(12) United States Patent
Puiatti

(10) Patent No.: US 12,227,095 B2
(45) Date of Patent: Feb. 18, 2025

(54) BASE AND CONTACT SYSTEM FOR RECHARGING ENERGY ACCUMULATOR IN MOBILE DEVICES

(71) Applicant: Skycharge GmbH, Berlin (DE)

(72) Inventor: Leo Puiatti, Trento (IT)

( * ) Notice: Subject to any disclaimer, the term of this patent is extended or adjusted under 35 U.S.C. 154(b) by 590 days.

(21) Appl. No.: 17/623,535

(22) PCT Filed: Jul. 16, 2020

(86) PCT No.: PCT/IB2020/056675
§ 371 (c)(1),
(2) Date: Dec. 28, 2021

(87) PCT Pub. No.: WO2021/009699
PCT Pub. Date: Jan. 21, 2021

(65) Prior Publication Data
US 2022/0355683 A1    Nov. 10, 2022

(30) Foreign Application Priority Data

Jul. 17, 2019   (IT) .......................... 102019000012207

(51) Int. Cl.
*B60L 53/65* (2019.01)
*B60L 53/16* (2019.01)
*B60L 53/30* (2019.01)

(52) U.S. Cl.
CPC ............. *B60L 53/16* (2019.02); *B60L 53/305* (2019.02); *B60L 53/65* (2019.02)

(58) Field of Classification Search
CPC .......... B60L 53/16; B60L 53/305; B60L 53/65
See application file for complete search history.

(56) References Cited

FOREIGN PATENT DOCUMENTS

| JP | 2014150642 | * | 8/2014 |
|---|---|---|---|
| RU | 2523420 | | 7/2014 |
| WO | 2008020463 | | 2/2008 |
| WO | 2017161394 | | 9/2017 |
| WO | 2019052961 | | 3/2019 |

\* cited by examiner

*Primary Examiner* — Robert Grant
(74) *Attorney, Agent, or Firm* — Themis Law

(57) ABSTRACT

A system for supplying electrical energy to an energy-absorber mobile device having two electrically conductive secondary terminals includes a power-source base with electrically conductive primary terminals configured to be arranged in contact with the two secondary terminals when the mobile device is positioned on the base; a supply and control subsystem having a line selector whose outputs are connected to the primary terminals, a rectifier and programmable power supply providing energy, and a mini-processor connected to the line selector and to the rectifier and programmable power supply. The line selector has two input lines, between which a voltage difference higher than zero is applied and which is configured to apply the voltage difference cyclically to all possible pairs of output lines based on the commands received from the mini-processor.

20 Claims, 6 Drawing Sheets

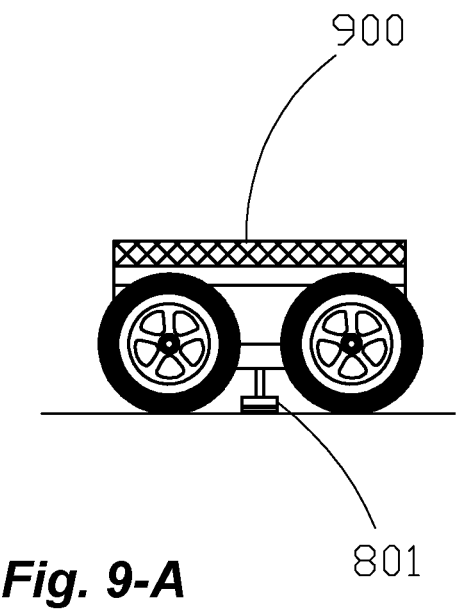
Fig. 9-A
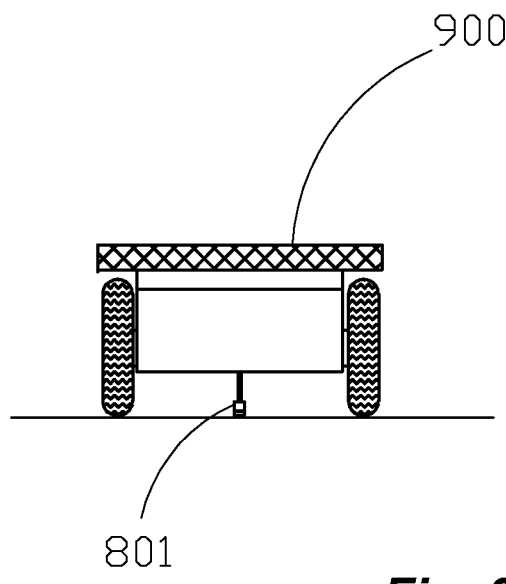
Fig. 9-B
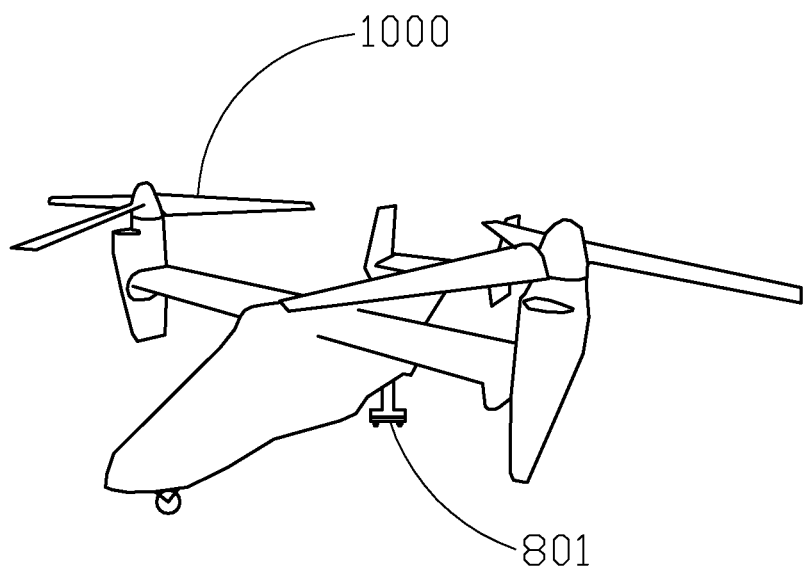
Fig. 10

BASE AND CONTACT SYSTEM FOR RECHARGING ENERGY ACCUMULATOR IN MOBILE DEVICES

FIELD OF APPLICATION

The present invention belongs to the field of systems for charging electrical energy accumulators used for feeding mobile devices such as, for example, ground or aerial vehicles.

State of the Art

The need arises from the possibility to connect and recharge the batteries used for driving autonomously-piloted mobile devices without human intervention or moving mechanical parts. The need concerns the possibility of recharging mobile vehicles in an automatized way, without moving mechanisms or parts, with a multi-functional apparatus suited for several kinds of vehicles and accumulators.

Currently the recharge of the batteries of mobile devices is made in several ways, mainly based on proprietary systems dedicated to the specific device whose batteries are to be charged.

Currently, the main ways that are used are as follows:
manual or automatized connection of a supply cable;
automatized replacement of the batteries with possible mechanical positioning of the mobile device;
displacement of the mobile device towards fixed charging contacts;
displacement of the charging contacts towards the mobile device;
displacement of a single charging contact towards the mobile device;
positioning systems of the mobile device with forced guides;
charging by conductive surfaces and multiple electrical contacts on the support base of the mobile device;
charging through magnetic induction.

The main limitations of the currently used solutions are:
the electromechanical complexity in coupling the contacts or in automatized replacing of the batteries;
the need for a precise spacial positioning of the mobile device and of the contact system;
the limited amount of energy that can be transferred;
the presence of conductive surfaces that are non-insulated and permanently under tension;
the presence on the mobile device of battery terminals that are exposed and under tension;
the protection from undesired contacts or short circuits;
the need of specific layouts for supplying different voltages and powers to different mobile devices.

The solution has the following aims: overcoming the drawbacks of the above shown currently used methods, with improvements in operability, lack of moving parts and automatization of energy supply for a wide range of mobile devices, in an efficient, reliable and cheap way.

DESCRIPTION OF THE INVENTION

The aforementioned aims are achieved by a system according to claim 1 and by a corresponding method according to claim 14. Further details of the invention are specified in the corresponding dependent claims.

The system consists of a conductive base provided with a set of electrically conductive primary terminals arranged on a plane and electrically insulated with one another, a supply and control subsystem connected to the primary terminals, and a subsystem installed on board of the energy-absorber mobile device (hereinafter also indicated with "contact kit") composed of secondary terminals, an identification circuit, and possibly circuits to control the batteries.

The base supplies energy when all the following conditions are fulfilled:
the mobile device is positioned on the base and the secondary terminals are in electrical contact with primary terminals;
the mobile device is detected by the supply and control subsystem through the contact kit of the mobile device;
the preset management rules for supplying energy to the mobile device through the supply and control subsystem are fulfilled.

The primary terminals positioned on the upper plane of the base are mutually insulated by non-conductive materials and are connected to the supply and control subsystem. The secondary terminals and the primary terminals have such predefined mutual geometric relations as to prevent that all secondary terminals installed on board of the mobile device simultaneously touch one single contact of the base. Moreover, the secondary terminals on board of the mobile device have a bigger contact dimension compared with the non-conductive materials that electrically separates the primary terminals.

The primary terminals through which the exchange of electrical energy occurs are being identified when the mobile device is positioned on the base and the secondary terminals of the mobile device contact the primary terminals. The identification of the primary terminals contacting the secondary terminals occurs by means of the identification apparatus on board of the mobile device and the line selector component of the base that cyclically applies a voltage difference to all possible pairs of primary terminals and detects the possible closure of a circuit between the primary terminals pairs under tension. If, consequently to the closure of the circuit, a characteristic current, predefined or falling within predefined thresholds, is detected, the primary terminals are considered to be identified. After identifying the primary terminals, the line selector applies to the identified primary terminals a voltage having a sign that is opposite to the previous one, and that originates a current that, if falling within predefined thresholds, allows to identify the right polarity to be supplied to the mobile device during the subsequent transfer of energy.

In case the closure of the circuit between two primary terminals under tension is due, for example, to a foreign conductive body, the currents detected do not fall within the expected characteristic thresholds, hence the system reports an anomaly. Following detection and subsequent identification of the mobile device, the base delivers electrical energy to the mobile device through the identified primary terminals and according to management criteria that are configured in the supply and control subsystem.

The solution is suitable to several embodiments that may differ in shape, dimensions and mode of electric insulation between the primary terminals.

In a further embodiment, having the purpose of limiting the number of conductors outgoing from the base, the primary terminals are organized in groups of adjacent primary terminals having the same number of primary terminals and in which each terminal of the group is connected in parallel with a corresponding terminal of another group. Each parallel of the primary terminals is thus connected to the supply and control subsystem.

In that way, the number of conductors outgoing from the base is limited and does not vary with, and is independent of, the total number of primary terminals used to make a base; this expedient allows to increase the number of primary terminals at will, without increasing manufacturing complexity and relating costs. In this case, the geometrical relations between the secondary terminals of the mobile device and of the base shall be such as to prevent that the secondary terminals, installed on board of the mobile device, from simultaneously contacting primary terminals mutually connected in parallel when the mobile device is positioned on the base. The identification of the primary terminals occurs as previously illustrated by means of the identification apparatus on board of the mobile device and the line selector component that cyclically applies a voltage difference to all possible pairs of groups of primary terminals and detects the possible closure of a circuit having a predefined characteristic current or falling within predefined thresholds.

In another embodiment the identification of the secondary terminals of the mobile device may be achieved through the exchange, between the contact kit of the mobile device and the supply and control subsystem, of a unique identifier. In the embodiment, the contact kit is provided with its own microprocessor, having non-volatile memory with configuration data.

In another embodiment, multiple secondary contacts may be used that have different geometric relations between primary and secondary contacts, with detection and identification techniques similar to those previously described.

The main advantages of the solution are:
the free positioning of the mobile device on the plane of the base;
the independence from the type of mobile device;
the efficient energy transfer, because there are no limits in the current that can be transported or in the voltage that can be applied;
the dimensional scalability and the flexibility of adaptation to different executive embodiments for specific needs;
the safety in operation;
the lack of mechanical parts in motion and the limited manufacturing cost.

DESCRIPTION OF DRAWINGS

Hereinafter the illustrative drawings referenced in the "Description of the execution" are described. The mobile devices represented in the drawings are ad unmanned ground vehicle (UGV) and a vertical takeoff airplane, but they may be different kind of mobile devices as well. The features and advantages of the present invention will be described by reference to a preferred practical embodiment, illustrated by way of non-limiting example in the attached drawings, in which:

FIG. 9-A represents a lateral view of a mobile device constituted of an unmanned ground vehicle having secondary terminals installed in ventral position;
FIG. 9-B represents a front view of a mobile device constituted of an unmanned ground vehicle having secondary terminals installed in ventral position;
FIG. 10 represents a perspective view of a mobile device constituted of a vertical takeoff plane having secondary terminals installed on the support foot.

The elements in the figures are illustrated to ease understanding of the text and are not necessarily represented in scale. For example, dimensions and relative positions of some elements in the figures may be exaggerated compared to other elements in order to improve understanding of the different embodiments allowed by the present invention. Moreover, common and well known elements in the technique, needed in the commercial manufacturing, may not be disclosed or represented, to render the context of the invention simpler and clear. Certain actions or steps may be disclosed or shown in a particular order, yet understandable by the experts in the field. Terms and expressions that are used have the meaning that is common in the technique when used by technical experts, except where different specific meanings are specified.

DESCRIPTION OF THE EXECUTION

The solution that is provided consists in an electrical connection system between a conducting base and an energy-absorber mobile device, and in the management of electrical energy supply from the base towards the energy-absorber mobile device.

The components of the system, described in the following, are:
A) a base of contact;
B) a supply and control subsystem;
C) a contact and identification subsystem installed on board of the mobile device;

A) Base of Contact

Figure 1:
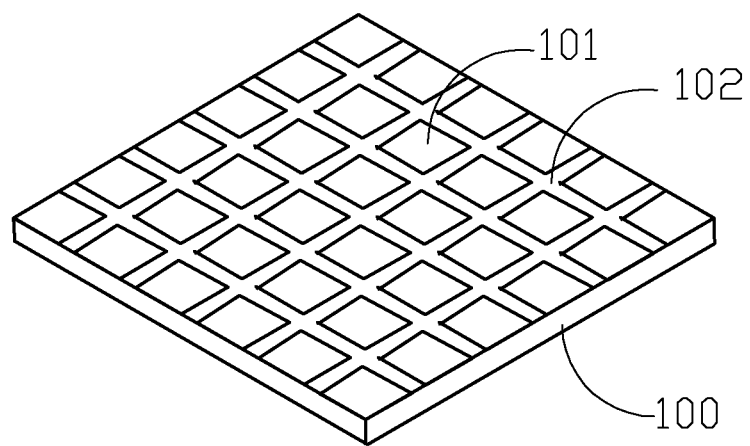
FIG. 1 represents a perspective view of the base.
Figure 2:
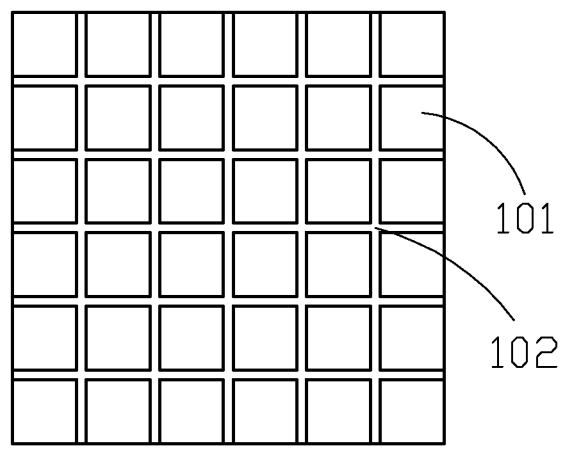
FIG. 2 represents an orthogonal view of the upper surface of the base.

The base of contact 100 represented in FIG. 1 and FIG. 2, is composed by a set of primary terminals 101 mutually electrically insulated and aligned to the upper plane of a base made of a non-conductive material.

Figure 3:
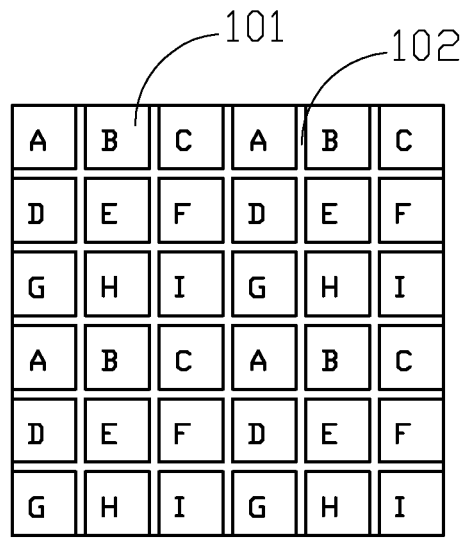
FIG. 3 represents an orthogonal view of the upper surface of the base indicating the sets of primary terminals.
Figure 4:
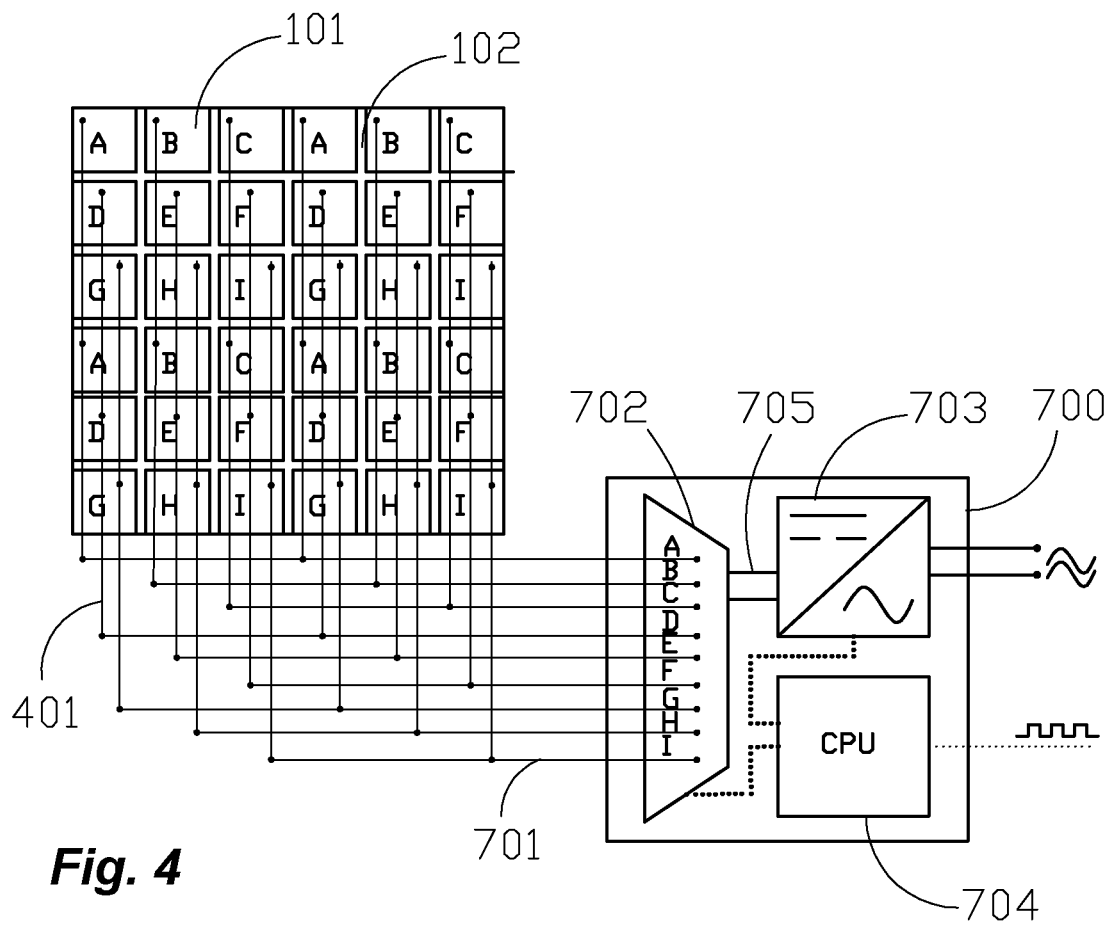
FIG. 4 represents the connection of the primary terminals to the line selector component of the supply and control subsystem.

In an exemplary embodiment illustrated in FIGS. 1 and 2, the primary terminals 101 are shaped as square tiles constituted by electrically conductive material and are mutually separated by non-conductive materials 102. Making reference to FIGS. 3 and 4, the primary terminals are grouped in multiple sets of primary terminals mutually connected in parallel through parallel conductors 401 that, in turn, are connected to outputs 701 of the line selector component 702, also called multiplexer. FIG. 3 shows the arrangement of the primary terminals 101 in groups of nine primary terminals in which each primary terminal belongs to a set called set "A", set "B", etc. until set "I"; all primary terminals of a set are connected on the lower side to cables 401, or tracks of a printed circuit, and are mutually arranged in parallel; the parallel of each group of primary terminals is hence connected to one of the nine outputs 701 of the line selector 702 as schematically shown in FIG. 4. Through the mentioned expedients, the number of conductors outgoing from the base is equal to the number of sets of primary terminals that, in the embodiment shown, are nine. In that way, it is possible to make bases having several or many primary terminals with a limited number of conductors connecting the base to the supply and control subsystem.

In further possible embodiments, the number of groups of primary terminals and the shape of the primary terminals may be different, for example in the case of the primary terminals having hexagonal shape, the groups of primary terminals are seven, as well as the conductors outgoing from the base for connecting to the line selector; otherwise, the groups of primary terminals contain a single contact that is connected directly to a line of the line selector: in the latter case, the line selector has a number of lines equal to the number of primary terminals. Further configurations and shapes are possible, while keeping the same rationals as above illustrated.

B) Supply and Control Subsystem

Figure 7:
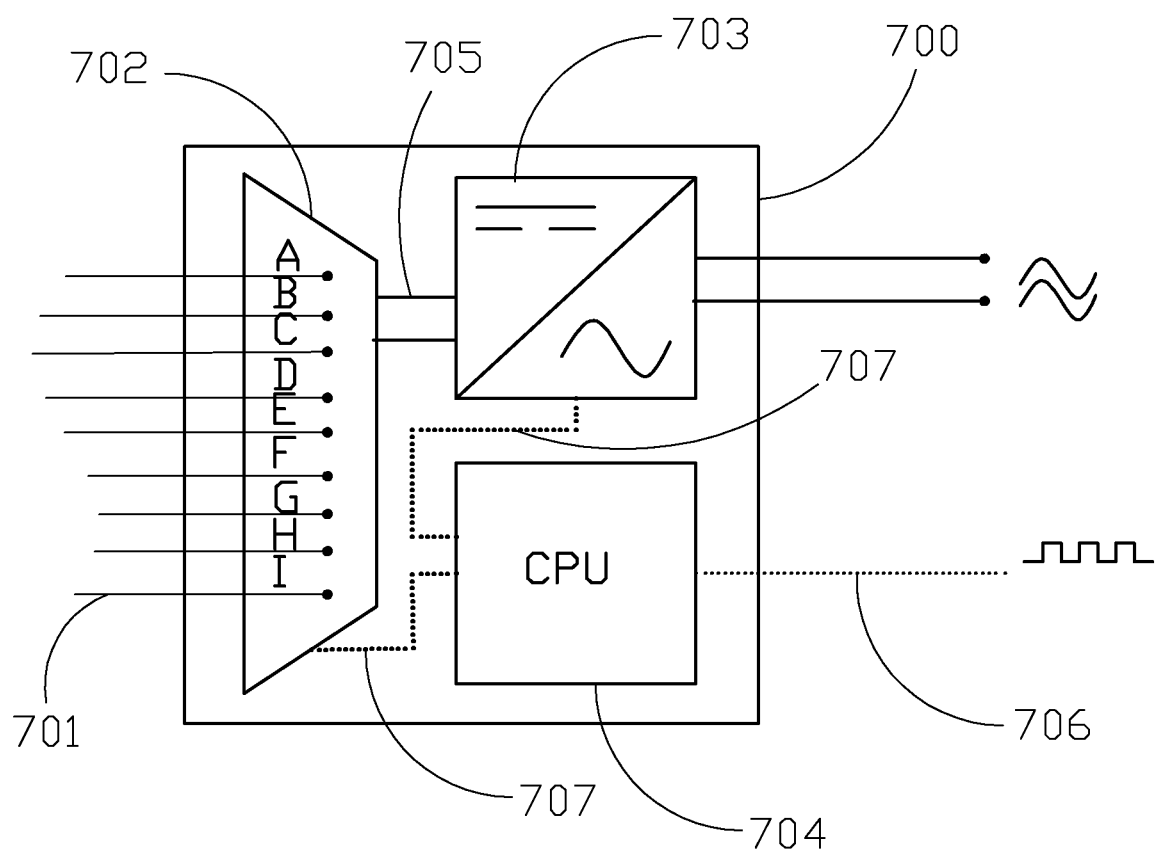
FIG. 7 represents the supply and control subsystem of the base.

The supply and control subsystem 700, represented in FIG. 7, is composed of: a line selector component 702, a programmable electrical AC/DC supply stage 703 and a mini-processor 704 provided with suitable software and non-volatile memory for storing data and configurations of the system. These components are mutually connected through data connections 707 and with external data connections 706 towards networks or other processors according to the schematic view of FIG. 7. As shown in FIG. 4, the multiplexer 702 connects two direct current supply inlets 705 with outlets 701 that in turn are connected to the nine sets of primary terminals "A", "B", etc., until a set "I". The supply stage provides the conversion between alternate to direct current and the electrical power; moreover, it has the possibility of programming voltage and outlet direct current through commands from microprocessor 704 by means of data connection 707.

Microprocessor 704 communicates with line selector 702 and with contact and identification subsystem 800 on board of the mobile device to acquire data, monitor energy transmission and send commands through wired or radio-frequency connections, with commercial standardized protocols.

C) Contact and Identification Subsystem

Figure 8:
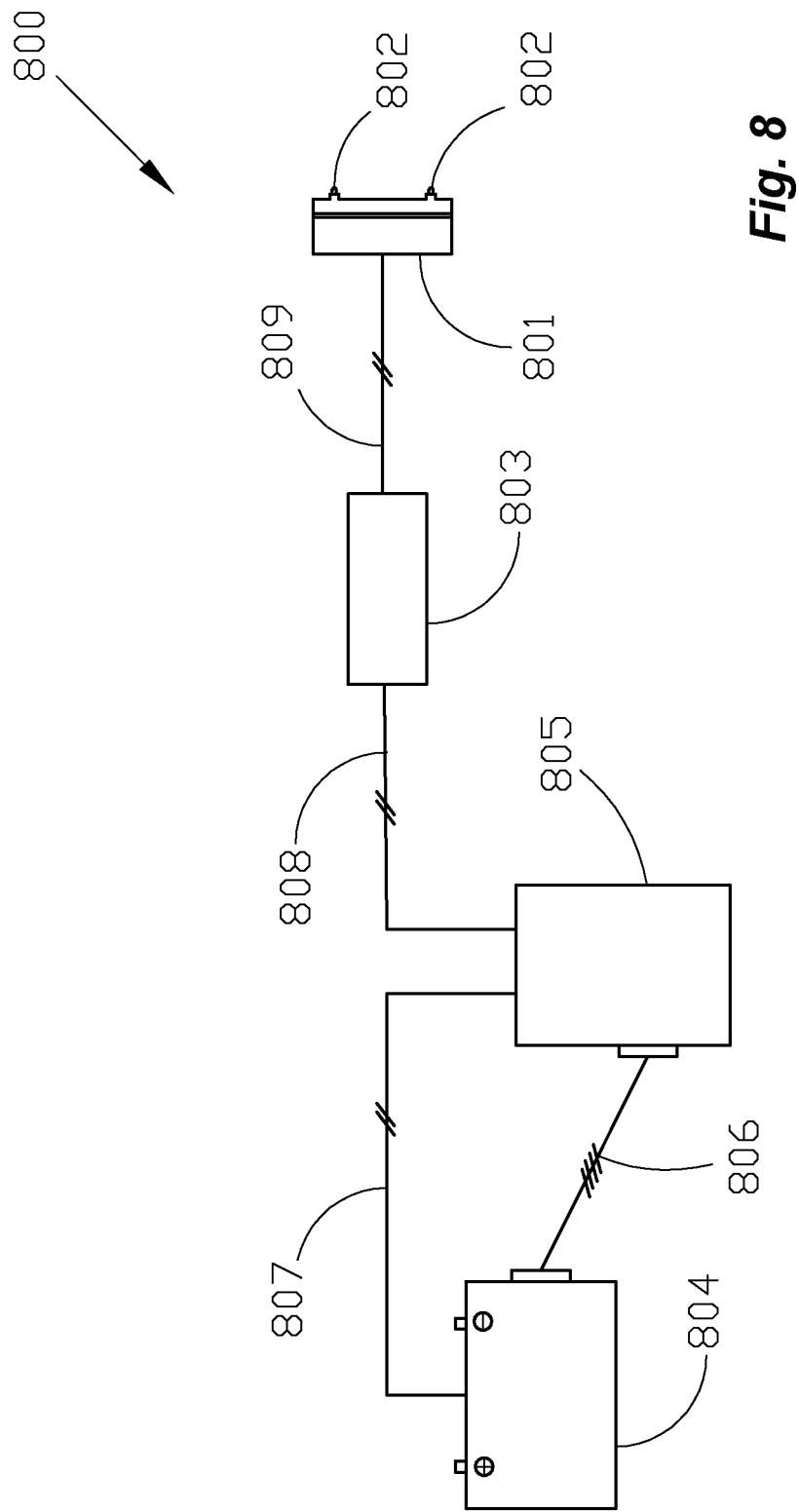
FIG. 8 represents the components of the subsystem on board of the mobile device.

Contact and identification subsystem 800 installed on board of the mobile device, represented in FIG. 8, is composed of: a detection circuit 803 having detection, identification and protection purposes, a support 801 with two secondary terminals 802. FIG. 8 also shows an energy absorber 804 and a management circuit 805 to control the electric power absorber, for example constituted by a Battery Management System (BMS) connected to the battery 804 through balance cables 806 and power cables 807, as schematically shown by non limiting example in the figure. In FIGS. 9-A and 9-B a mobile device is represented in lateral and front views, that is constituted of an unmanned ground vehicle (UGV) on which the support 801 for the secondary terminals 802 is installed. In FIG. 10 a mobile device is represented that is constituted of a vertical takeoff plane 1000 on which the support 801 for the secondary terminals 802 is installed on one of the supporting legs.

Figure 5:
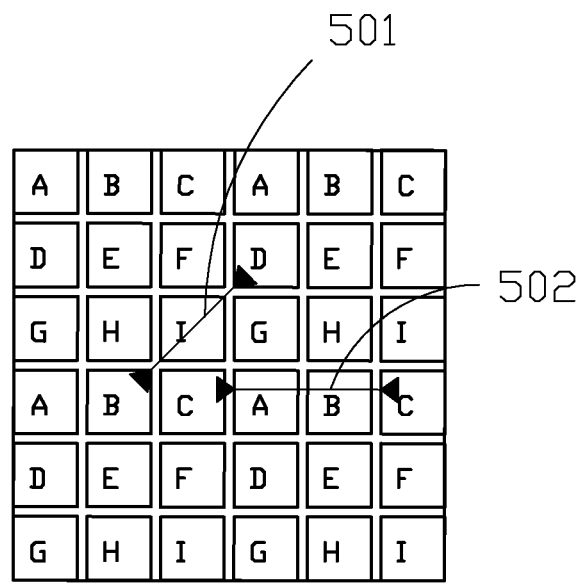
FIG. 5 represents an orthogonal view of the upper surface of the base indicating the dimensional relations between the secondary terminals of the mobile device and the primary terminals.
Figure 6:
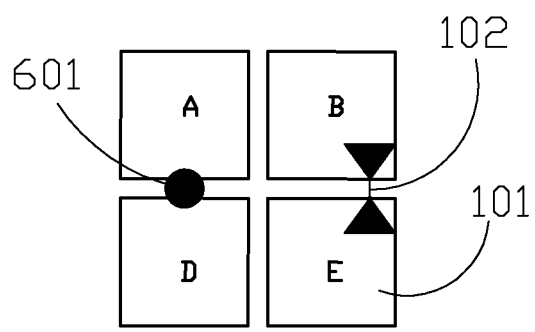
FIG. 6 represents a detail of some primary terminals indicating the dimensions of contact of the secondary terminals of the mobile device in relation to the insulation spaces between the primary terminals.

Making reference to FIGS. 5 and 6, the dimensions of the two secondary terminals 802 installed on board of the mobile device, i.e. their mutual distance and the diameter of the contact area 601 of a single contact 802, are geometrically correlated to the dimension and the shape of the primary terminals 101 of the base and of the distance of electrical insulation 102 interposed between the primary terminals 101 of the base. The example illustrated in FIGS. 5 and 6, in which the primary terminals have square shape, evidences the minimum dimensions 501 and maximum dimensions 502 of the distances that may exist between the secondary terminals of the mobile device, as well as the minimum dimension of the contact area 601 of a single secondary contact. As evidenced in FIG. 6, the dimension of a single secondary contact 802 of the contact kit installed on the mobile device has a contact surface 601 that, preferably, shall have a diameter bigger than the insulation space 102.

In the above exemplary execution, still making reference to FIGS. 5 and 6, in which the primary terminals have square shape, the distance between the secondary terminals 802 of the contact kit installed on the mobile device shall be, preferably:

bigger than or equal to the sum of the diagonal of a primary terminal and of twice the diagonal of an insulation space, identified in FIG. 5 as 501;

smaller or equal to twice the sum of the length of a side of a primary terminal 101 and of an insulation space 102, identified in FIG. 5 as 502.

The secondary terminals 802 of the mobile device may be made through spring pressure with cylindrical or spherical head, through conducting wheels, through tinned copper braids, through graphite or any other shape and material that is suitable to ensure an adequate electric contact and the required flow of current; they may be individually constituted by one or by multiple contact points. Support 801, or secondary terminals 802 individually, may be installed on the mobile device either rigidly or on elastic supports or on movable and controllably operable arms. The distances between the secondary terminals 802 and the dimensions of the contact area 601 of the mobile device and the corresponding geometrical relations with the primary terminals may be different compared to the ones previously mentioned, based on the shapes of the primary terminals and the distances of electrical insulation interposed between the primary terminals.

Operation

When the mobile device 1000 or 900 is positioned on the base 100, due to the dimensional relations between the primary terminals 101 of the base and the secondary terminals 802 of the mobile device, the secondary terminals 802 installed on board of the mobile device are in electrical connection with two or more primary terminals 101 of the base belonging to different sets of primary terminals. The line selector component cyclically scans all possible pairs of primary terminals 101 connected to different sets of primary terminals and, when it connects the first pair of primary terminals in electrical contact with the secondary terminals 802, it closes an electric circuit towards the detection circuit 803 and measures a current. If the measured current falls within predefined thresholds, the primary terminals 101 of the base, that are in contact with the secondary terminals 802, are identified.

In this way the supply and control subsystem 700 identifies the primary terminals 101 connected to the secondary terminals 802 of the mobile device and. Preferably, by a subsequent identification phase through inversion of the polarity of the applied voltage, the supply and control subsystem 700 measures a second current. The different values of those two currents is used to indicate to the system the polarity to be applied to the primary terminals 101 for the subsequent energy transfer.

According to a variant embodiment, the aforementioned subsequent identification phase is not performed and the right polarity is inferred directly from the value of the current detected during the first scan phase.

Following the identification of the primary terminals 101 and of the direction of polarity of the voltage to be applied to the mobile device, the supply and control system applies the working voltage to the identified primary terminals that are connected to the secondary terminals 802 and to the conductors 809 entering the detection circuit 803; the detection circuit 803, on detecting the said inlet voltage, opens the connection on the energy absorber side, thus connecting the input cables 809 with the output cables 808 hence starting the energy transfer with the preset parameters.

In the following, the operating methodologies are disclosed in detail, making reference to the statuses of the supply and control subsystem 700.

Scan Status

The supply and control subsystem 700 cyclically scans all pairs of primary terminals 101 connected to distinct sets of primary terminals, by applying a test voltage; if the electric circuit of a pair of primary terminals 101 belonging to different sets of primary terminals 101 is open, the supply and control subsystem 700 goes on to check the subsequent pair of primary terminals 101.

In this phase, to the involved primary terminals 101 a voltage is applied only for the duration of the scan (some milliseconds), moreover for safety reasons the applied voltage is very low (some volts) and the power that can be supplied is limited. If the electric circuit of a pair of primary terminals 101 belonging to a different sets is closed, a current consequently transit which the supply and control subsystem 700 analyzes, changing its state if necessary.

Preferably, the supply and control subsystem 700 stops the scan and passes directly to the next phases as soon as it detects a short circuit condition at a pair of primary terminals 101.

According to a variant embodiment of the invention, before passing to the next phases the supply and control subsystem 700 performs the scan of all the aforementioned pairs of primary terminals 101 and saves the currents detected for each pair or the corresponding circuit conditions.

The sequence of pairs of primary terminal 101 that are scanned may be defined so as to comprise all the possible pairs of primary terminals 101, where each pair is used twice, with inverted orders. Hence, such a sequence coincides with the set of dispositions without repetition of 2 elements out of the set of primary terminals 101, that, as known, has a cardinality equal to N×(N−1), where N is the number of primary terminals 101. In that way, each pair of primary terminals 101 is selected twice in the sequence, respectively with opposite polarities.

According to a variant embodiment, the sequence of pairs of primary terminals 101 is defined so as to comprise all possible pairs of primary terminals 101, but without the above inversion of their order. Such a sequence coincides with the set of combinations without repetition of 2 elements out of the set of primary terminals 101, that, as known, has a cardinality equal to half of that of the preceding embodiment. In the latter embodiment, the right polarity to be applied is established after identifying the pair of primary terminals 101 connected to the secondary terminals 802, according to what will be described later on. Advantageously, this variant embodiment allows to perform the scan in a shorter time compared to the previous embodiment.

Evidently, if the primary terminals 101 are connected in parallel so as to define the above mentioned sets A-I, what disclosed above shall be modified so that, during each pass of the scan, a set A-I of primary terminals 101 is selected instead of a single primary terminal 101.

Anomaly Status

If current values are detected that are above or under the expected thresholds, due for example to the presence of foreign bodies, conductive or partially conductive, the system switches to anomaly status, hence temporarily suspending the scan.

Pre-Activation Status

If current values are detected falling within the preset thresholds, the primary terminals 101 are correctly identified.

Identification Status

To the previously identified primary terminals 101 a voltage is applied having inverted polarity, which originates a current having a different value due to a different impedance of the detection circuit 803 when it is subjected to currents of opposite side. If also the said value falls within the preset thresholds the system is able to determine the right polarity to be applied to the primary terminals 101, hence identifying the contact kit and thus the mobile device on which it is installed.

According to a variant embodiment of the invention, the above mentioned inversion of polarity at the primary terminals 101 does not occur, and the right polarity is inferred from the values of detected currents, depending on whether the said values fall within a first interval of currents, in which case a the right polarity is identified as a first polarity, or they fall within a second interval of currents, in which case the right polarity is identified as the polarity opposite the above first polarity.

According to a further variant embodiment of the invention, the possible inversion of polarity does not occur at the level of the primary terminals 101, but rather at the level of the contact and identification subsystem 800 of the mobile device 1000, which comprises a polarity control device, not shown in the drawings but in itself known, for example integrated in the detection circuit 803 or, in any case, interposed between the secondary terminals 802 and the energy absorber 804. The above polarity control device is configured to determine the polarity of the voltage difference present at the secondary terminals 802 due to the connection with the two identified primary terminals 101 and to exchange the connections between the secondary terminals 802 and the energy absorber 804 in case the above polarity does not correspond to the right one for supplying the energy absorber 804.

Pre-Supply Status

After the identification phase and after a preset time interval, the working voltage with the right polarity is applied to the contact kit; the delay so introduced allows to possibly cooling the energy absorbers and it may be correlated to a temperature signal transmitted be the mobile device.

Supply Status

The supply and control subsystem 700 applies the working voltage to the primary terminals connected to the secondary terminals, hence putting the inlet conductors 809 of the detection circuit 803 under tension; when the detection circuit 803 detects that voltage, it opens the electrical connection outgoing towards the energy absorber, which begins to absorb electric current; the supply and control subsystem 700 detects that current and switches to supply status. If, subsequently, the electric circuit is opened, the supply and control subsystem 700 switches back to the scan status.

Post-Supply Status

When the charge of the battery is considered complete, the supply and control subsystem suspends the supply of energy and the subsequent scan phase for a predefined time interval that can be and customized, with the aim of optimizing the operating lifespan of the batteries.

According to a variant embodiment of the invention, the test voltage and the working voltage are not supplied by the same power supply 703, that is controlled by the microprocessor 704 to supply each of the two voltages when needed.

According to a variant embodiments of the invention, not shown in the drawings, the aforementioned two voltages may be supplied by two distinct power supplies, both controlled by the microprocessor 704.

In further embodiments, the above disclosed operation may be carried out using, instead of the characteristic current values, digital signals suited to detect and identify the mobile device, monitor and send commands or effecting preset instructions. In that case the detection circuit 803, installed on board of the mobile device, has a microprocessor and non-volatile memory suited to store software programs and parameters, among which a unique identifier.

The identification phase previously disclosed may be performed by the supply and control subsystem through establishing a dialogue with the identification circuit 803 and acquiring its unique identifier.

When in scan status, the control and supply subsystem cyclically connects the primary terminal pairs as above illustrated and, in each connection, waits for a preset time a data packet transmitted by the detection circuit 803, which performs the function of identifying the primary terminals and identifying the contact kit installed on board of the mobile device. Using such an operating mode the possible anomaly, for example due to a short circuit between two primary terminals, will be reported, will not be blocking and the scan will proceed for searching a possible primary terminal pair providing the data packet hence allowing the subsequent energy exchange. The above operating mode allows to activate the energy supply with specific parameters, linked to the identifier associated to the mobile device. For example it will be possible to set, from time to time, the values of voltage and electric power to be activated as a function of the specific mobile device which stations on the base and to detect parameters transmitted by the mobile device to the supply and control subsystem 700.

The supply and control subsystem 700, through the miniprocessor component 704, also makes it available commands to control and set all operating parameters; it provides a monitoring of the supplied energy suited to detect possible abnormal conductive events due to the presence, between the primary terminals 101, of conductive or partially conductive materials or of short circuits, for example due to foreign conductive materials arranged on the base, for the sake of safety and integrity of the apparatuses. The monitoring of the supplied energy allows to: determining the accumulator charge status and determining the completion of the charge, performing economic estimations of the transferred energy, verifying the state of health of an accumulator for example through the analysis of the history of the charging sequences and the indirect measurement of the internal impedance of the accumulator.

The operation of the base is intrinsically safe due to the absence of moving mechanisms or parts, due to the presence of low voltages and limited energy for the very short time intervals during the scan phase. Moreover the subsystem on board of the mobile device avoids that the secondary terminals 802 of the mobile device are under tension when, at the inlet of the detection circuit 803, the working voltage is not present. For example, in case of an energy absorber constituted of a battery, that expedient avoids that the battery voltage is brought on the secondary terminals 802 that otherwise would be dangerously exposed when the mobile device is not positioned on the base.

Advantages of the Solution and Industrial Use

The salient aspects of the present solution are:
the freedom in positioning the mobile device with respect of the plane of the base;
the independence of the contact system from the kind of mobile vehicle;
the efficient energy transfer, because there are no limits in the power that can be transported or in the voltage that can be applied;
the complete automation in establishing a contact between mobile vehicle and charging station and of the subsequent energy transfer, with remote control and monitoring;
the operational safety;
the dimensional scalability and the flexibility to be adapted to different embodiments for specific needs;
the absence of moving parts and the low manufacturing cost.

The industrial use of the present system for the supply of electrical energy to recharge accumulators of a mobile device is applicable, in a simple way and at low costs, to a number of devices operating with energy sources provided by accumulators, such as for example:
ground vehicles (e.g.: UGV);
aircrafts;
robots;
industrial handling systems.

The invention claimed is:
1. A system for supplying electrical energy to an energy-absorber mobile device (900; 1000) comprising two electrically conductive secondary terminals (802), said system comprising:
a power-source base (100) having a plurality of electrically conductive primary terminals (101), positioned on an upper surface of said base (100) and separated by electrically non-conductive materials (102), said primary terminals (101) being configured to be arranged in contact with said two secondary terminals (802) when said mobile device (900; 1000) is positioned on said base (100);

a supply and control subsystem (700) comprising a line selector (702) whose output lines (701) are connected to said primary terminals (101), a rectifier and programmable power supply (703) which supplies energy, and a mini-processor (704) connected to said line selector (702) and to said rectifier and programmable power supply (703) for exchange of data and commands, wherein said line selector (702) has two input lines (705) between which a voltage difference higher than zero is applied and which is configured to apply said voltage difference cyclically to all possible pairs of said output lines (701) and, consequently, to corresponding pairs of primary terminals, based on said commands received from said mini-processor (704), and wherein said supply and control subsystem (700) is configured to:

apply said voltage difference to said pairs of said output lines (701) until detecting that two primary terminals (101) of the corresponding pair are connected to said two secondary terminals (802), hence are identified, and apply to said two primary terminals (101) a working voltage different than said voltage difference.

2. The system according to claim 1, wherein said mini-processor (704) is configured to operate said power supply (703) so as to invert a polarity of said voltage difference when said mini-processor detects a closure of an electric circuit between one of said pair of primary terminals (101).

3. The system according to claim 1, wherein said supply and control subsystem (700) is configured to apply said working voltage with a predefined delay after said two primary terminals (101) have been identified.

4. The system according to claim 1, wherein said primary terminals (101) are grouped in multiple sets (A-I) of primary terminals (101) connected in parallel with each other and connected to said output lines (701) of said line selector (702).

5. A system for supplying electrical energy to an energy-absorber mobile device (900; 1000) comprising two electrically conductive secondary terminals (802), said system comprising:

a power-source base (100) having a plurality of electrically conductive primary terminals (101), positioned on an upper surface of said base (100) and separated by electrically non-conductive materials (102), said primary terminals (101) being configured to be arranged in contact with said two secondary terminals (802) when said mobile device (900; 1000) is positioned on said base (100);

a supply and control subsystem (700) comprising a line selector (702) whose output lines (701) are connected to said primary terminals (101), a rectifier and programmable power supply (703) which supplies energy, and a mini-processor (704) connected to said line selector (702) and to said rectifier and programmable power supply (703) for exchange of data and commands, wherein said line selector (702) has two input lines (705) between which a voltage difference higher than zero is applied and which is configured to apply said voltage difference cyclically to all possible pairs of said output lines (701) and, consequently, to corresponding pairs of primary terminals, based on said commands received from said mini-processor (704), further comprising said mobile device (900; 1000) and a contact and identification subsystem (800) installed on board of said mobile device (900; 1000), said contact and identification subsystem (800) comprising an energy absorber (804) and said two secondary terminals (802), said mobile device (900; 1000) being configured to absorb energy while stationing on said base (100) irrespective of a positioning of said mobile device on a plane of said base (100).

6. The system according to claim 5, wherein said contact and identification subsystem (800) comprises a detection circuit (803) towards which said line selector (702) closes an electric circuit when said output lines (701) are connected to a pair of said primary terminals (101) in electric contact with said two secondary terminals (802), in such a way that said line selector (702) can measure a current, said detection circuit (803) being configured to establish a connection towards a side of said energy absorber (804) when said detection circuit detects a working voltage at its inlet to start transferring energy towards said energy absorber (804), so as to prevent said secondary terminals (802) to be under tension if at said inlet of said detection circuit (803) said working voltage is not present.

7. The system according to claim 6, wherein said contact and identification subsystem (800) comprises a polarity control device configured to determine a polarity of said voltage difference and to exchange connections between said secondary terminals (802) and said energy absorber (804) if said polarity does not correspond to a correct polarity for supplying said energy absorber (804).

8. The system according to claim 5, wherein each secondary terminal (802) has a support section (601) whose dimension is greater than a non-conductive space between two mutually adjacent primary terminals (101).

9. The system according to claim 5, wherein said primary terminals (101) are grouped in multiple sets (A-I) of primary terminals (101) connected in parallel with each other and connected to said output lines (701) of said line selector (702), and wherein said secondary terminals (802) are dimensionally correlated to said primary terminals (101), in such a way as to prevent said secondary terminals from simultaneously contacting said primary terminals (101) belonging to a same one of said multiple sets (A-I) of primary terminals (101).

10. The system according to claim 6, wherein said supply and control subsystem (700) is configured to dialogue with said detection circuit (803) to identify the pair of primary terminals (101) in electrical contact with said secondary terminals (802) and to identify a polarity of electrical voltage to be applied to said secondary terminals (802).

11. The system according to claim 5, wherein said contact and identification subsystem (800) comprises an identification circuit provided with a unique identifier to distinguish said identification circuit, said supply and control subsystem (700) being configured to acquire from said identification circuit said unique identifier through an electrical connection established between said base (100) and said contact and identification subsystem (800) or by radio-frequency connection.

12. The system according to claim 11, wherein said supply and control subsystem (700) is configured to supply energy to said mobile device (900; 1000) with values of voltage and electric current that are predefined or correlated to the unique identifier acquired by the identification circuit.

13. A method for operating a system according to claim 6, comprising:
performing a cyclic scan of all possible pairs of outputs (701) of said line selector (702), by applying to each of said pairs, and consequently to a corresponding one of said pairs of primary terminals (101), a voltage difference that is greater than zero;
detecting a first current due to a closure of a circuit between said pairs of outputs (701) of said line selector (702) that are electrically connected to said primary terminals (101) to which said voltage difference was applied;
analyzing said first current and determining whether a value thereof falls within a range of characteristic values that indicate a closure of the circuit on said secondary terminals (802) and hence identifies said pair of primary terminals (101) in contact with said secondary terminals (802);
applying to said identified primary terminals (101) a working voltage; and
enabling a connection of said energy absorber (804) with said secondary terminals (802) when a voltage difference is detected at an input of said energy absorber on a side of said secondary terminals (802) and when said contact and identification subsystem (800) is correctly identified, so as to supply energy to said mobile device (900; 1000).

14. The method according to claim 13, further comprising the step of applying to said identified pair of primary terminals (101) a voltage difference having a sign opposite to a voltage difference applied during the step of performing a cyclic scan so as to obtain a second current, and comparing a value of said second current with a value of said first current to identify a right polarity for said working voltage.

15. The method according to claim 13, further comprising the step of reporting anomalies and, if desired, suspend the step of performing a cyclic scan in case said first current or, if applicable, said second current, do not fall within a characteristic range of values, or in case alarms are detected from support sensors.

16. The method according to claim 13, wherein said contact and identification subsystem (800) comprises an identification circuit provided with a unique identifier to distinguish said identification circuit, said supply and control subsystem (700) being configured to acquire from said identification circuit said unique identifier through an electrical connection established between said base (100) and said contact and identification subsystem (800) or by radio-frequency connection, and wherein the step of applying said working voltage to said identified pair of primary terminals (101) comprises:
acquiring said unique identifier from said detection circuit (803) through an electrical connection established between said pair of primary terminals (101) and said secondary terminals (802) or via radio connection; and
supplying said electric energy from said base (101) to said mobile device (900; 1000) by supplying said working voltage and power based on preset parameters or based on parameters correlated to an identification of said contact and identification subsystem (800).

17. The method according to claim 13, wherein performing said cyclic scan comprises, after each application of said voltage difference to each one of said pairs of primary terminals (101), waiting for a predefined time, by said supply and control subsystem (700), for a data packet transmitted by said detection circuit (803) and adapted to identify said contact and identification subsystem (800).

18. The method according to claim 13, further comprising the step of exchanging data and commands with other external systems through a standard interface provided by said mini-processor (704).

19. The method according to claim 13, wherein the step of analyzing said first current comprises the step of determining whether a value of said first current corresponds to a condition of open circuit, short circuit, or false contact.

20. The method according to claim 13, wherein the step of analyzing said first current and, if applicable, said second current, occurs after completion of said cyclic scan on all possible pairs of said outputs (701) of said line selector (702) according to a predefined sequence.

* * * * *